UNITED STATES PATENT OFFICE.

GILBERT McCULLOCH, OF EAST ST. LOUIS, ILLINOIS, ASSIGNOR TO ALUMINUM COMPANY OF AMERICA, OF NIAGARA FALLS, NEW YORK, A CORPORATION OF PENNSYLVANIA.

MANUFACTURE OF ALUMINA.

938,269.     Specification of Letters Patent.     Patented Oct. 26, 1909.

No Drawing.     Application filed May 19, 1909. Serial No. 496,962.

*To all whom it may concern:*

Be it known that I, GILBERT MCCULLOCH, of East St. Louis, county of St. Clair, and State of Illinois, have invented a new and useful Improvement in the Manufacture of Alumina, of which the following is a specification.

My invention is an improvement in the manufacture of alumina, and is applicable to any process of manufacture in which the alumina is precipitated from a solution of sodium aluminate by means of carbon dioxid gas. It is applicable, for example, to the process described in the patent of Charles M. Hall, No. 663,167, dated December 4, 1900. In the practice of such process a solution of sodium aluminate is formed, which may be done by any of the methods known to the art, and alumina is precipitated from it by passing over it or through it gas containing carbon dioxid. In the resulting reaction the carbon dioxid combines with the soda to form sodium carbonate and precipitates the alumina in the form of aluminum hydrate, which may be removed with a filter press, washed, and calcined to form anhydrous alumina which may be employed in the manufacture of aluminum. It has been found that in such processes the solution of sodium aluminate which is made from bauxite carries a considerable proportion of silica which in the ordinary processes of precipitation by means of carbon dioxid is precipitated along with the alumina and thus contaminates the product.

I have discovered a process by which alumina of much greater purity can be obtained and I will now describe the same.

In the practice of my invention I complete the precipitation of alumina from the solution of sodium aluminate in the manner usually employed, by passing over or through the solution carbon dioxid and agitating the solution; and I carry on this precipitation until practically all of the alumina is precipitated, which causes also the precipitation of the silica from the solution, so that the precipitate is, for the purposes of alumina, impure. I then add to the solution an amount of caustic soda (NaOH), preferably equivalent to about 10 per cent. of the entire amount of soda present in the solution reckoned as caustic soda; but the amount may be varied and may be more or less, according to the proportion of silica present in the precipitate. The flow of $CO_2$ gas having been discontinued, I then continue to agitate the charge, preferably from one to three hours, in like manner as is ordinarily practiced during the original precipitation of the alumina, except that during this time no $CO_2$ gas is introduced. By these means, namely, by the action of the added caustic soda and the agitation of the solution, I find that the great bulk of the silica which has been precipitated with the alumina is re-dissolved in the solution and that very little of the alumina is re-dissolved with it; so that in the practice of the process which I have conducted I have found that from a precipitate of 75 to 85 grams of alumina per liter, only 1.5 to 3 grams is re-dissolved, but that nearly all of the silica is re-dissolved. At the end of this time, when analysis shows that the silica contained in the precipitate has been mainly re-dissolved in the solution, I run the entire charge out of the agitators and filter it so as to remove the alumina; and the filtered liquor containing the re-dissolved silica and a small portion of alumina is then preferably conducted back to the digester department, where it can be used as the basis of re-dissolving another charge of alumina from crude bauxite.

The following is an example of the process as it has been practiced by me and which I give by way of example, not for the purpose of limiting the invention to the precise details of procedure or proportion therein set forth, these being capable of variation by those skilled in the art, within the principle of my invention as defined in the claims.

I have taken an original liquor to be charged into the agitator, containing approximately the following compounds in solution: $Al_2O_3$ 75 to 85 grms. per L., $Na_2CO_3$ 40 to 50 grms. per L., $Na_2O$ combined with $Al_2O_3$ and reckoned as NaOH 105 to 115 grms. per liter, $SiO_2$ .15 to .30 grms. per L. A liquor of this composition having been charged into the agitator and the $CO_2$ gas having been passed thereover and the liquor being agitated, the $CO_2$ reacts with the sodium aluminate forming $Na_2CO_3$ and aluminum hydrate until all the alumina and $SiO_2$ has been precipitated. The liquor at this point has approximately the following composition: $Al_2O_3$ 0, $SiO_2$ 0, $Na_2CO_3$ 165 to 185 grams per L., and the precipitated aluminum hydrate contains from .10% to .20%

$SiO_2$. At this point I cut off the gas and add to the agitator an amount of caustic soda equal to approximately 10% of the entire soda content and agitate from 1 to 3 hours. I then discontinue the agitation and filter the product when the composition of the liquor has been changed to the following: $Al_2O_3$ 1.50 to 3.00 grms. per L., $Na_2CO_3$ 165 to 185 grms. per L., $Na_2O$ combined with $Al_2O_3$ and reckoned as NaOH 10 to 20 grms. per L.; $SiO_2$ .10 to .20 grms. per L., and the silica in the aluminum hydrate has been reduced to .03% to .06%. With solutions containing less silica I add a smaller amount of caustic soda, and with a higher silica content in the liquor it is necessary to add more caustic soda.

I claim:

1. In the manufacture of alumina by the alkaline process, wherein the alumina is precipitated from a solution of sodium aluminate, the improvement which consists in adding to the solution after the period of precipitation caustic alkali and re-dissolving the silica precipitated with the alumina.

2. In the manufacture of alumina by the alkaline process, wherein the alumina is precipitated from a solution of sodium aluminate, the improvement which consists in adding to the solution after the period of precipitation caustic alkali, re-dissolving the silica precipitated with the alumina, and withdrawing the liquor containing the re-dissolved silica and alumina and using it as a basis for dissolving other alumina from bauxite.

3. In the manufacture of alumina by the alkaline process, wherein the alumina is precipitated from a solution of sodium aluminate by $CO_2$ gas, the improvement which consists in adding to the solution after the period of precipitation caustic alkali and re-dissolving the silica precipitated with the alumina.

In testimony whereof, I have hereunto set my hand.

GILBERT McCULLOCH.

Witnesses:
  RAY GARRETT,
  IRENE BACON.